UNITED STATES PATENT OFFICE.

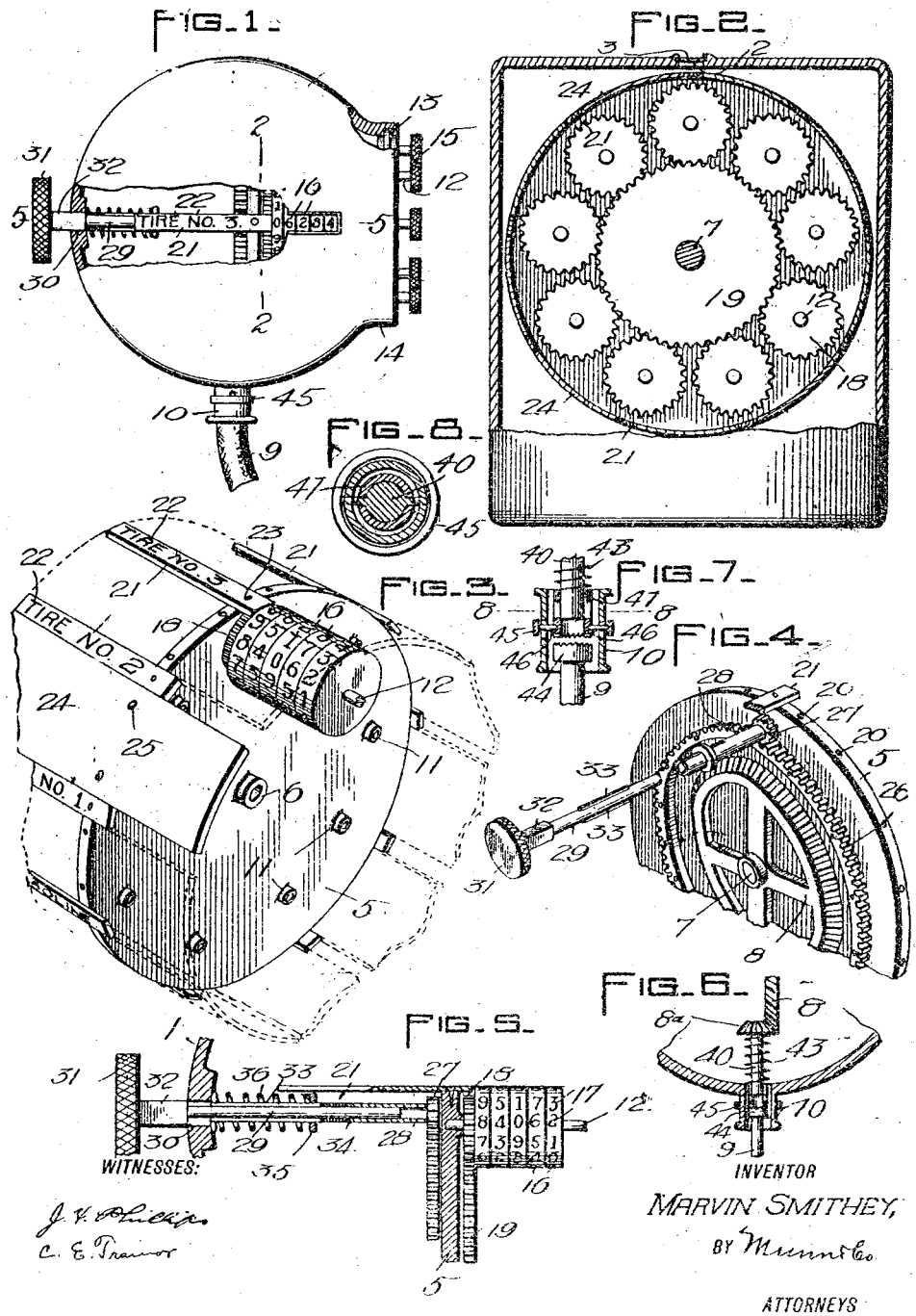

MARVIN SMITHEY, OF LAWRENCEVILLE, VIRGINIA.

AUTOMETER.

1,195,862.  Specification of Letters Patent.  Patented Aug. 22, 1916.

Application filed August 30, 1915. Serial No. 48,068.

*To all whom it may concern:*

Be it known that I, MARVIN SMITHEY, a citizen of the United States, and a resident of Lawrenceville, in the county of Brunswick and State of Virginia, have invented a new and useful Improvement in Autometers, of which the following is a specification.

My invention is an improvement in autometers, and the invention has for its object to provide a device of the character specified, for use with motor vehicles, wherein a series of synchronously driven registering devices is provided driven from the vehicle together with means for identifying the several devices with the tires, the fuel, the oil, the differential, and the transmission, to provide a register of the number of miles each tire has made, including the extra tire, and to furnish a register of the number of miles made on each supply of fuel and oil, and a register of the number of miles for each packing with grease of the transmission and the differential.

In the drawings: Figure 1 is a side view of the meter with the outer casing removed, Figs. 2 and 5 are enlarged sections on the lines 2—2 and 5—5, respectively, of Fig. 1, Fig. 3 is a partial perspective view showing one of the registering or recording devices, Fig. 4 is a similar view showing the adjusting mechanism, Fig. 6 is an enlarged section showing the releasable connection between the driving shaft and the meter, Fig. 7 is an enlarged vertical section with the clutch mechanism, and Fig. 8 is a section on the line 8—8 of Fig. 7.

The present embodiment of the invention comprises a substantially cylindrical casing 1, having in the top thereof an opening 2, in which is arranged a sheet 3 of transparent material, the sheet normally closing the opening. Within the casing a disk 5 is arranged, and this disk has a central hub 6. A stub shaft 7 is journaled in the hub, and a bevel gear wheel 8 is secured to the shaft on the inner face of the disk. This gear wheel 8 meshes with a bevel pinion 8ª, which is connected to the inner end of a flexible shaft 9, the said shaft passing through a nipple 10, extending radially from the casing, and the other end of the shaft 9 is driven from one of the front wheels in the usual manner to cause the shaft 7 to be rotated when the vehicle is running.

The disk 5 is provided with an annular series of hubs or bearings 11, and the said hubs or bearings are spaced apart at equal distances from each other and at equal distances from the central hub 6. Each of the bearings 11 is closed at its inner end as shown in Fig. 5, and a stub shaft 12 is journaled at one end in each bearing.

The outer end of each stub shaft is journaled in a disk 13, which is arranged within an opening in a lateral extension 14 from the casing 1, and a knurled knob 15 is secured to the outer end of each shaft for permitting the shaft to be turned. Each of the shafts 12 supports registering mechanism, and each of the said mechanisms comprises a series of number wheels 16, five wheels being provided in each series in the present instance. Each of the wheels 16 is provided on its peripheral face with a series of numerals 17, the said numerals being arranged consecutively and running from 0 to 9. A pinion 18 is mounted on each shaft adjacent to the disk 5, and all of the pinions 18 mesh with a gear wheel 19, which is secured to the shaft 7 before mentioned, on the opposite face of the plate 5 from the bevel gear wheel 8. The registering devices are similar and each is of usual construction, and all are driven synchronously from the shaft 7.

In the present instance nine registering devices are provided, and the disk 6 is mounted to rotate within the casing 1 in order that any predetermined registering device may be brought into position beneath the opening 2 to permit the said device to be read.

The disk 6 is provided in its peripheral surface with a series of openings 20, and a series of label plates 21 is secured to the disk. Each of these plates 21 carries a legend 22 on its outer face, and the plates are arranged at the registering devices, and in line with the outer portions of the said devices. The arrangement is such that those numerals of the several wheels of each device which are in alinement with the adjacent plate 21 are the registering numbers.

The plates 21 are secured to the disk by means of screws 23 or the like, which pass through openings in the plates and engage the openings 20 and between each pair of adjacent plates 21 a plate 24 is arranged. The plates 21 have the greatest portion of their length on the inner side of the disk 5 as shown in Fig. 5, and the outer end of each plate extends approximately flush with the outer face of the adjacent pinion 18.

The plates 24 are as before stated, arranged between the plates 21, and the said plates 24 are of greater length than the plates 21. Each plate 24 has its inner end flush with the inner end of the plates 21, while the outer end of each plate 24 extends to the outer face of the outermost wheel 16. Thus a space is provided at each indicating device at the outer end of the adjacent plate 21, and in this space the registering numbers appear.

The plates are secured in place by means of screws 25 or the like, which are passed through openings in the plates and engaging the openings 20 of the disk. Means is provided for bringing each registering device to the opening 2 in order that the said device may be read. This mechanism comprises a gear ring 26 which is secured to that face of the disk adjacent to the bevel gear 8, and outside of the said gear and coaxial therewith. A pinion 27 meshes with the gear 26, and the pinion 27 is secured to the end of the outer section 28 of a telescoping shaft, consisting of the said outer section and an inner section 29. The inner section 29 of the shaft extends through an opening 30 in the casing 1, and the outer end of the said shaft has a knurled wheel or knob 31, for convenience in rotating the said section. Adjacent to the knob 31 the shaft section 29 is polygonal in cross section as indicated at 32, being square in the present instance, and the opening 30 in the casing is polygonal to fit this polygonal portion.

It will be evident that when the polygonal portion of the shaft section engages the polygonal opening it will be impossible to rotate the shaft, but when the shaft is moved outwardly as shown in Fig. 5 to disengage the portion 32 from the opening 30 the shaft may be rotated.

The shaft section 29 is provided with longitudinally extending oppositely arranged ribs or feathers 33, and these ribs or feathers are adapted to engage longitudinally extending slots 34 in the shaft section 28 to constrain the shaft sections to turn together. The shaft section 28 is provided near the end remote from the pinion 27 with a stop 35, and the said stop is in the form of a collar rigid with the shaft section. A coil spring 36 encircles the section 29 of the shaft between the collar 35 and the inner face of the casing 1 and normally holds the shaft section 28 with the pinion 27 in engagement with the gear ring 26. When it is desired to bring any particular registering device into register with the opening 2 of the casing, the knob 31 is grasped and the shaft section 29 is pulled outward against the resistance of the spring 36. As soon as the polygonal portion 32 of the shaft is disengaged from the polygonal opening 30 the shaft section 29 may be turned, and because of the ribs 33 and the slots 34 the shaft sections will turn together. The pinion 27 will be rotated, and the gear ring 26 will be rotated, rotating the disk 5. The operator watching through the opening 2 will know when the particular registering mechanism desired is at the opening. This opening is long enough to permit the adjacent plate 21 to be seen also, and these plates are labeled.

The device as before stated, is intended to show the mileage of each of the four tires, the extra tire, the packings for differential, and transmission, and the fuel and oil. The plates 21 bear legends indicating these particular parts as for instance, the plates are labeled Tire No. 1, Tire No. 2, Tire No. 3, Tire No. 4, Extra tire, Gasoline, Oil, Transmission and Differential.

In operation when a new tire is placed the particular registering mechanism pertaining thereto is set at zero. In the same manner the registering mechanisms of the transmission and the differential are set at zero for each packing of grease of the said transmission and differential.

The clutch mechanism will be connected whenever the vehicle is in use, and should it be necessary to remove a tire for instance, tire No. 1, to repair the same that registering device pertaining to tire No. 1 is released by means of the knob 15 belonging thereto. If the extra tire is used to replace tire No. 1 temporarily that registering device pertaining to the extra tire is clutched to the operating mechanism. Whenever tire No. 1 is replaced, if the extra tire is not in use, the registering mechanism pertaining thereto is released while that of tire No. 1 is clutched to the driving shaft.

When the fuel in the tank is exhausted the mileage made on that particular amount of fuel will be registered by the registering device pertaining to the fuel supply. When a new supply is inserted the registering device pertaining to the fuel supply will be set at zero and the same applies in regard to the mechanism pertaining to the oil supply.

Whenever for instance, the differential or the transmission is packed with grease anew the registering device pertaining to the differential or to the transmission whichever may be repacked is set at zero. Whenever any of the tires is not in use temporarily the registering device pertaining thereto is released from the driving mechanism and the same is true whenever a new supply of oil or a new supply of fuel is inserted.

Thus the driver or the owner of the vehicle has a certain registration of the mileage performed by each tire, of the mileage made on each gallon of fuel and on each gallon of oil, and in addition he has the mileage made by the transmission and by the differential at each packing.

All of the registering mechanisms are driven synchronously and any particular mechanism may be disconnected from the driving shaft by means of the knob 15, pertaining thereto. The registering mechanism is of the usual construction and for this reason is not described more particularly.

The knobs 15 constitute resetting devices to permit the registering devices to be reset. Means is also provided for disconnecting shaft 9 from the shaft 7, to permit the registering devices to be brought into reading position.

With the improved meter the exact mileage of every tire can be seen at a glance. The improvement is not intended to designate the wheels but the tires irrespective of the wheels on which they are placed. The registering devices are the ordinary form of odometer.

The releasable connection between the shaft 9 and the shaft 7 is shown in Figs. 6 to 8. The pinion 8ª before mentioned, is secured to the inner end of a stub shaft 40. The lower end of the stub shaft 40 carries a movable section 41, which is feathered on to the stub shaft, oppositely arranged feathers being provided on the shaft which move in slots or grooves in the clutch section.

The upper end of the shaft 9 carries a fixed section 44, and a ring 45 is mounted on the nipple 10, for longitudinal movement thereof. This ring has inwardly extending radial pins 46, which engage an annular groove in the movable clutch section, the pins passing through longitudinally extending slots in the nipple 10 into engagement with the groove.

A coil spring 43 is arranged between the bevel gear 8ª and the movable clutch section, and this spring acts to hold the parts in normal position. When it is desired to release the shaft 9 from the stub shaft 40 and from the shaft 7 the clutch section 41 is moved upwardly, by means of the ring 45. When the ring is moved downwardly the clutch sections are connected.

I claim:—

1. In a meter, a casing, a disk rotatably disposed within the casing, a plurality of shafts journaled at one end in the face of the disk, a series of number wheels carried by each of said shafts, each series of number wheels constituting a registering mechanism, an individual label for each registering mechanism, a central stub shaft journaled in said disk, connections between said stub shaft and each of the first named shafts for imparting the movements of said stub shaft to said first named shafts, and means for rotating said disk to bring any one of said registering mechanisms and its associated indicator labels before said opening.

2. In a meter, a disk, a shaft journaled at the center of the disk, means for driving said shaft, a series of auxiliary shafts journaled in spaced relation on the disk at one face thereof, and extending laterally from the disk, each of said auxiliary shafts having a driving connection with the first named shaft, registering mechanism supported on each of said auxiliary shafts, a label secured to the disk and each registering device and forming an indicator for said device, a gear ring secured to the disk on one face thereof, a pinion meshing with the gear ring, a casing in which the disk is mounted and having an opening in its top for exposing said label and the registering device adjacent thereto.

3. In a meter, a disk, a shaft journaled at the axis of the disk, a series of auxiliary shafts journaled in spaced relation on the disk at one face thereof and extending laterally from the disk, each auxiliary shaft having a driving connection with the first named shaft, each auxiliary shaft supporting registering mechanism, a label secured to the disk at each registering device and forming an indicator for said device, a gear ring secured to the disk on one face thereof, a pinion meshing with the gear ring, a casing for the disk having an opening in its top for exposing any one of said labels and its associated registering device, a shaft secured to the pinion and extending outside of the casing, and having a head for permitting the shaft to be turned whereby the disk is rotated.

4. In a meter, a disk, a shaft journaled at the axis of the disk, a series of auxiliary shafts journaled in spaced relation on the disk at one face thereof and extending laterally from the disk, each auxiliary shaft having a driving connection with the first named shaft, each auxiliary shaft supporting registering mechanism, a label secured to the disk at each registering device and forming an indicator for said device, a gear ring secured to the disk on one face thereof, a pinion meshing with the gear ring, a casing for the disk having an opening in its top for exposing any one of said labels and its associated registering device, a shaft secured to the pinion and extending outside of the casing and having a head for permitting the shaft to be turned when the disk is rotated, and means for locking the shaft from movement.

5. In a meter, a disk, a shaft journaled at the axis of the disk, a series of auxiliary shafts journaled in spaced relation at equal distances from one another and at the same distance from the axis of the first named shaft, said auxiliary shafts being parallel with the first named shaft and being disposed on the disk at one face thereof, each auxiliary shaft having a driving connection with the first named shaft, each auxiliary shaft supporting registering mechanism, a label secured to the disk at each registering device and forming an indicator for said device, a gear ring secured to the disk on one face thereof, a pinion meshing with the gear ring, a casing for the disk having an opening in its top for exposing any one of said labels and its associated registering device, a shaft secured to the pinion and extending outside of the casing and having a head for permitting the shaft to be turned when the disk is rotated, and means for locking the shaft from movement.

MARVIN SMITHEY.

Witnesses:
 NELLIE SMITHEY,
 H. S. OSBURN.